Figure 1:
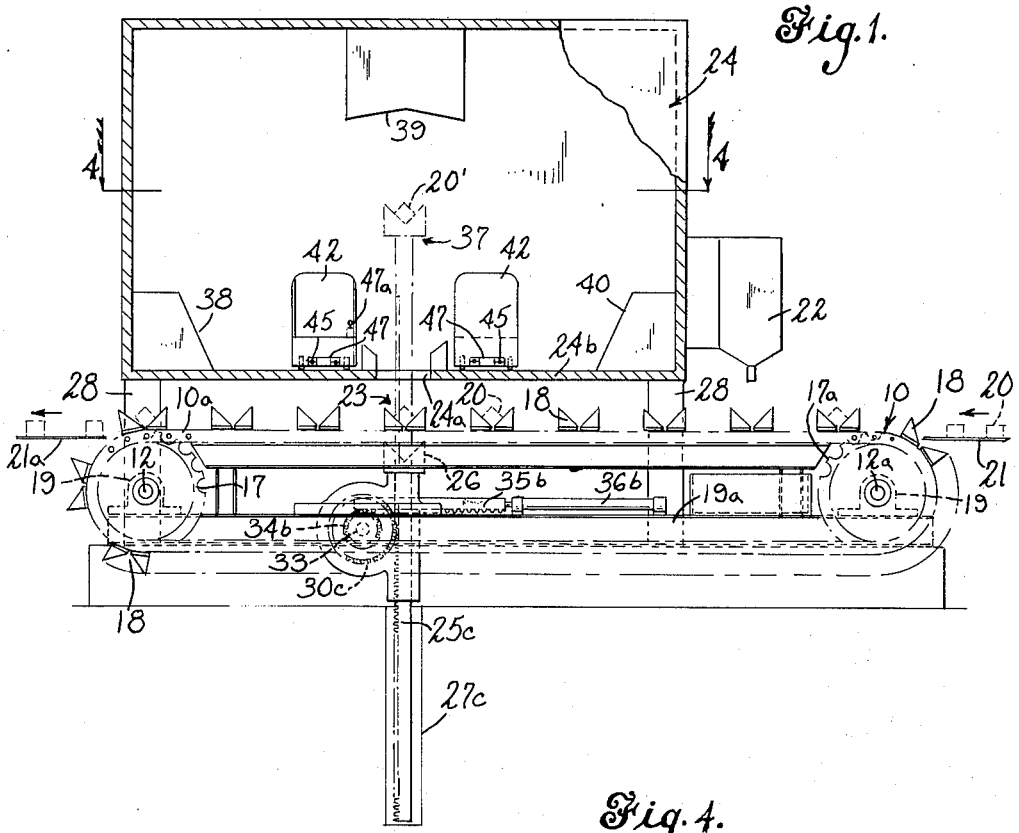

Oct. 26, 1965

G. R. FRYER 3,213,997

INSPECTION MACHINE

Filed July 2, 1963

3 Sheets-Sheet 1

INVENTOR
George R. Fryer

BY Rockwell & DeLio
ATTORNEYS

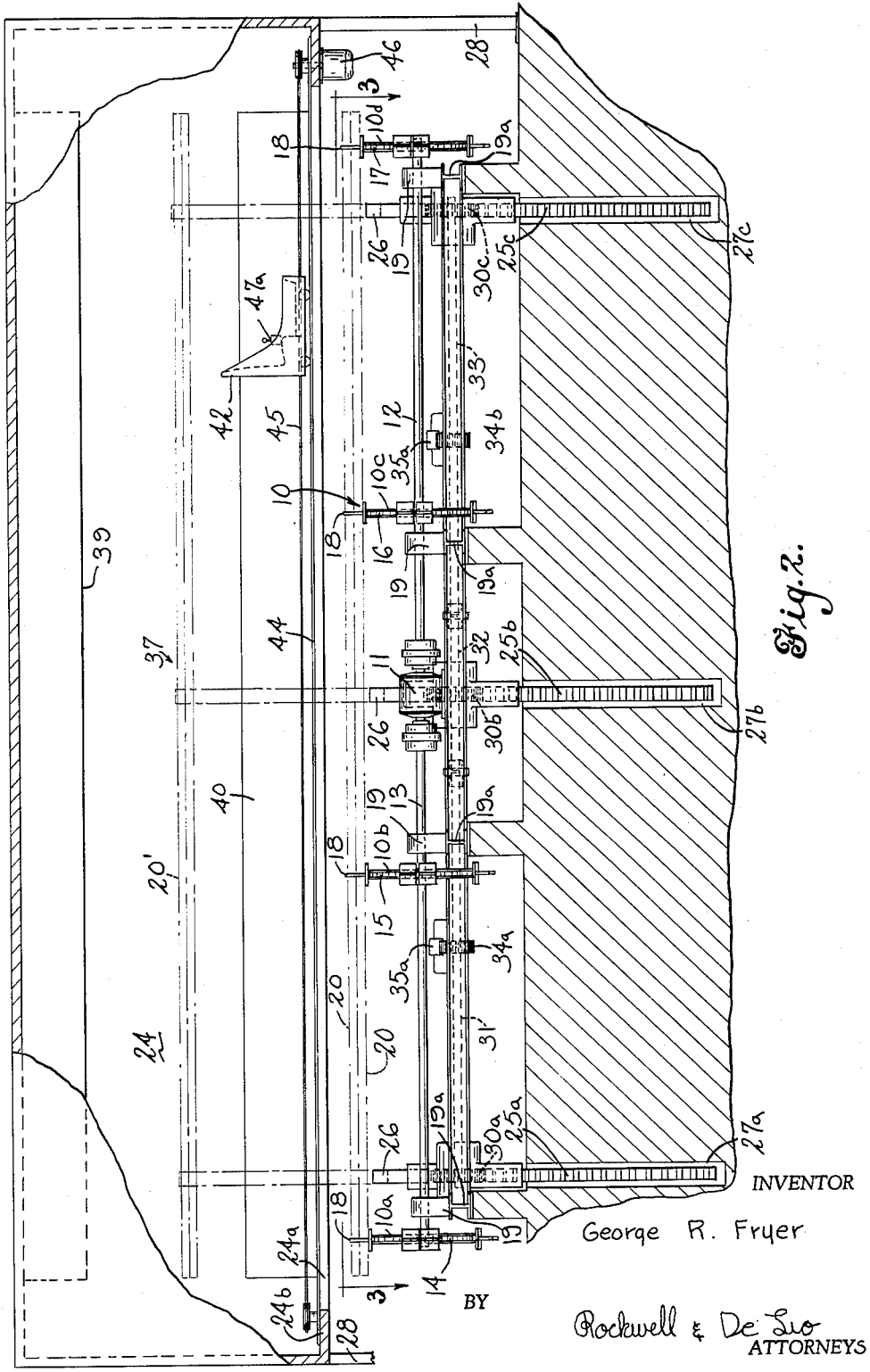

Oct. 26, 1965   G. R. FRYER   3,213,997
INSPECTION MACHINE
Filed July 2, 1963   3 Sheets-Sheet 3

INVENTOR
George R. Fryer
BY
Rockwell & DeLio
ATTORNEYS

United States Patent Office 3,213,997
Patented Oct. 26, 1965

3,213,997
INSPECTION MACHINE
George R. Fryer, Ansonia, Conn., assignor to Farrel Corporation, Ansonia, Conn.
Filed July 2, 1963, Ser. No. 292,381
8 Claims. (Cl. 198—19)

This invention relates to inspection machines and more particularly relates to such machines arranged to accomplish inspection of objects as they are moved along a conveyor or processing line.

Inspection machines embodying the invention may be utilized for the inspection of diverse types of articles. However, machines embodying the invention are particularly adapted for use in inspecting elongated objects and therefore will be disclosed in such an environment.

In rolling mill operations there is a need for the inspection of partially rolled bars or billets to discover imperfections such as scabs, laps, slivers or cracks which would impair the final rolled product if not removed prior to subsequent rolling. In an attempt to discover such imperfections, rolling mills utilize an inspection operation, wherein the partially rolled billets are examined for defects by use of some form of non-destructive testing such as magnetic particle inspection, etc.

In inspecting bars and billets there are a number of operational characteristics which must be observed. The billets or bars should be examined on all sides and throughout the whole length. Some presently known machines require a certain amount of manual or power manipulation of the billet in order to turn it to expose all sides of the billet to the inspector's vision. In addition, a considerable amount of walking may be required by the inspector or inspectors, along the length of the billets, considering that the billets may be of lengths up to 40 ft. or more.

The present invention provides an inspection machine for elongated objects such as billets which hastens the inspection operation by presenting the billet in a simple manner for inspection from all sides and additionally makes observation of the billet from one end to the other more convenient and therefore more efficient for the inspectors. An inspection machine embodying the invention produces no angular movement of the object to be inspected other than when it is transferred to or from the machine, and requires no dumping or dropping of an object which might be injurious to the objects or the machine. Moreover, the invention provides an inspection machine having a greater degree of operator safety. The operator(s) may view an object to be inspected without the hazards attendant with being in proximity to a moving conveyor or processing line.

Accordingly, it is an object of this invention to provide a new and improved machine for facilitating inspection of elongated objects.

It is another object of this invention to provide a machine for inspecting elongated object which facilitates presentation of all surfaces of the object to an inspector or inspectors.

A further object of this invention is to provide a new and improved inspection machine for facilitating inspection of objects in a processing line which provides increased safety for inspecting personnel.

Figure 4:
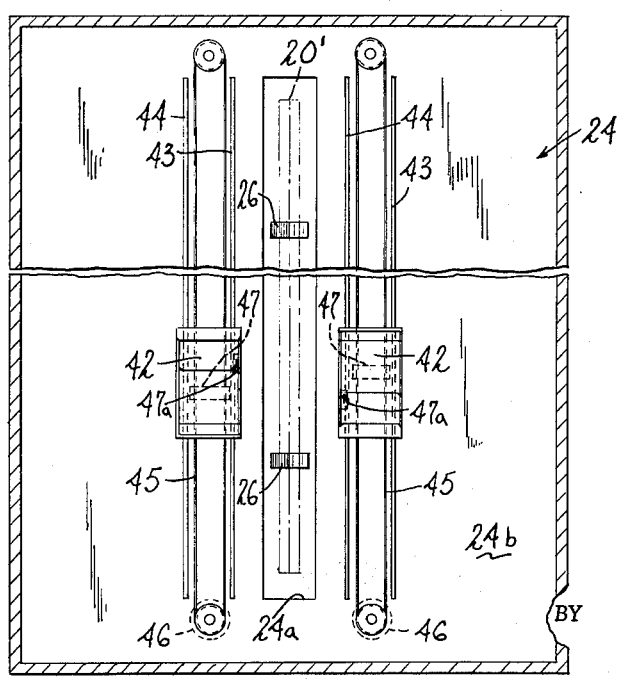
Figure 3:
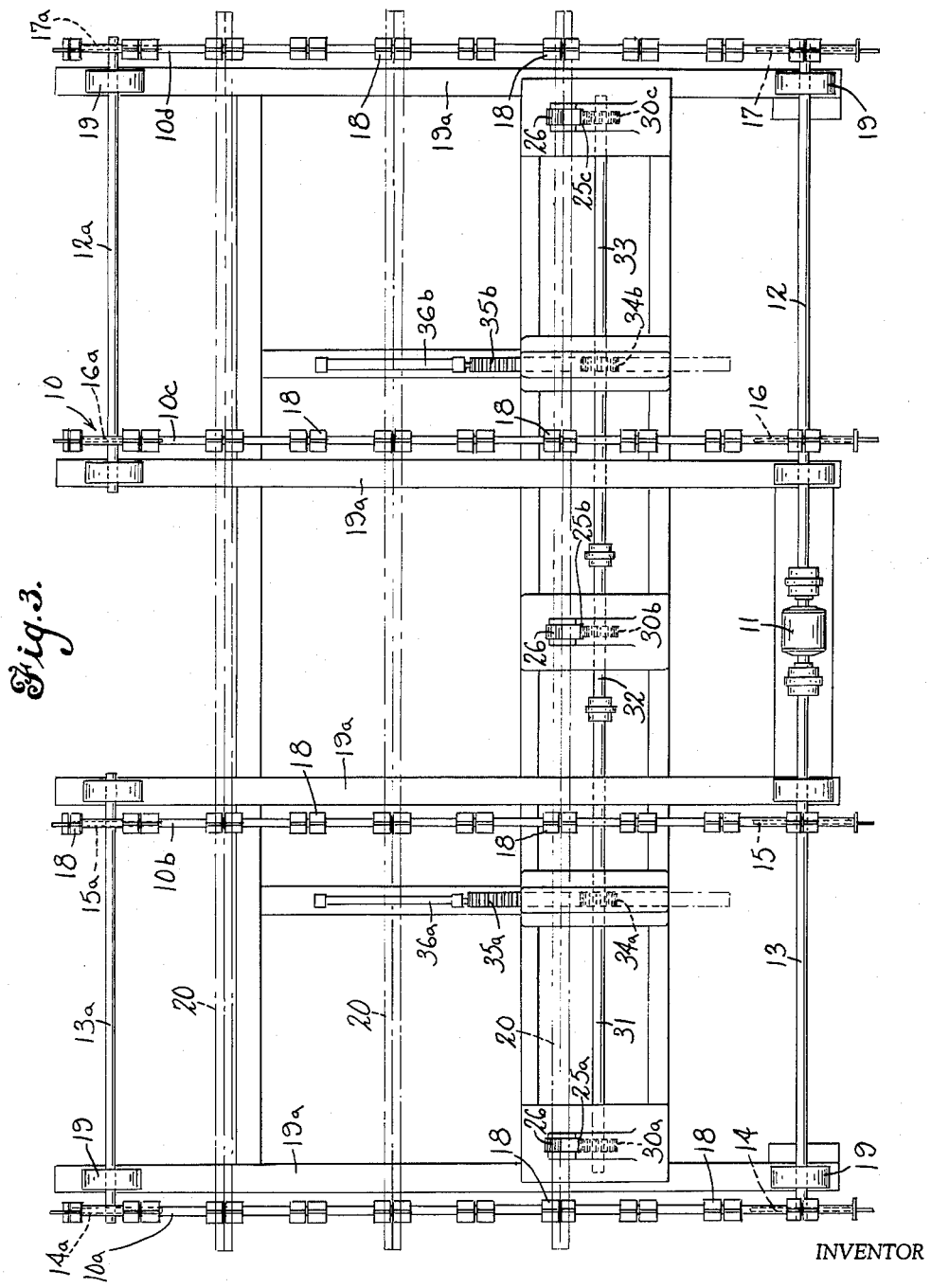

The features of the invention which are believed to be novel are pointed out with particularity and distinctly claimed in the concluding portion of this specification. However, the invention, both as to its organization and operation together with further objects and advantages thereof, may best be appreciated by reference to the following detailed description taken in conjunction with the drawings wherein:

FIG. 1 is a side elevation, partially in section, of an inspection machine embodying the invention;
FIG. 2 is an end elevation of a machine embodying the invention and also illustrates a portion of the foundation therefor in section;
FIG. 3 is a view seen along line 3—3 of FIG 2; and
FIG. 4 is a view seen along line 4—4 of FIG. 1.

A preferred embodiment of the invention comprises an inspection machine as shown having a conveyor 10 which comprises a plurality of parallel conveyor chains 10a, 10b, 10c and 10d all driven in synchronism by an electric motor 11. Motor 11 through shafts 12 and 13 connected thereto, drives chain gears 14, 15, 16 and 17, each of which drive one of the conveyor chains about a cooperating follower gear 14a, 15a, 16a and 17a, respectively.

Mounted on each of the conveyor chains 10a, 10b, 10c and 10d are receivers 18 aligned across the several conveyor chains and arranged to receive an object to be inspected. Receivers 18 are located at spaced apart intervals on each conveyor chain and are aligned in such a manner that an elongated object extending across the four conveyor chains would be received in a receiver on each chain. The shafts 12 and 13, as well as shafts 12a and 13a mounting follower gears 14a, 15a, and 16a, 17a, respectively, are rotatably carried in bearings 19, resting on sills 19a.

In the illustrated embodiment of the invention the receivers 18 defines a V shaped recess adapted to receive elongated bars or billets 20 which are brought to conveyor 10 on a movable transfer table 21 and deposited thereon in four aligned receivers, one on each conveyor chain. While the disclosed embodiment of the invention comprises four conveyor chains it will be understood that more or less may be utilized as may be required by the shape and dimensions of the objects to be inspected. Conveyor 10 may be advanced either continuously or intermittently depending upon the inspection schedule. Drive motor 11 may be operated to advance conveyor 10 in increments to present each bar or billet 20 at the inspection station under control of the inspector or it may be programmed to advance a desired number of billets a predetermined distance in a selected unit of time.

Each of the billets to be inspected is prepared for inspection prior to arriving at the inspection station. A common inspection method is that of magnetic particle inspection which may be utilized in conjunction with the invention. As illustrated, the bar or billet or other metallic object is adapted to be coated with a solution containing magnetic particles, from a dispenser 22. Excess liquid which drains from the bar or billets is preferably collected and recirculated for subsequent bars. Inasmuch as this type of preparation for inspection of metallic objects is well known to those skilled in the art no detailed explanation of such process will here be given.

Upon being coated with the fluid from dispenser 22 the bars 20 are advanced on conveyor 10 towards an inspection position generally indicated by reference numeral 23.

Means are provided for presenting each or less than each object to an inspection station from the inspection position. Means are further provided for removing each object from the conveyor 10, presenting it to the inspection station and upon completion of inspection returning the object to the receivers from which it was removed and advancing the conveyor to present a succeeding billet for inspection. After a billet or bar has been returned to its receivers from the inspection station it is advanced to a receiving table 21a which provides a discharge point for the inspected billets.

When a billet or bar reaches the position indicated at 23 it may be lifted into inspection station 24 for inspection through an aperture 24a in platform 24b, as exemplified by bar 20¹. Means are provided for elevating a billet or bar comprising a plurality of racks 25a, 25b and 25c having receivers 26 at the upper end thereof contoured to receive the object undergoing inspection. As illustrated the receivers 26 define a V shaped recess similar to receivers 18. The racks extend into wells 27a, 27b, and 27c defined in the foundation or other means which support the inspection machine. It will be noted that the inspection station 24 is supported above conveyor 10 by means of columns 28 straddling conveyor 10.

Racks 25a, 25b, and 25c are driven by pinions 30a, 30b and 30c. Pinions 30a, 30b, and 30c are mounted on coupled shafts 31, 32 and 33, respectively, and are driven thereby. Shafts 31 and 33 have mounted thereon gears 34a and 34b, driven by racks 35a and 35b, respectively. Racks 35a and 35b are actuated, as illustrated by hydraulic or pneumatic piston and cylinder arrangements 36a and 36b. It will be apparent and understood, however, that the shafts 31, 32 and 33 may be driven by other suitable means such as a motor. In practice the piston-cylinder arrangements 36a and 36b are connected to a common source of hydraulic fluid or pneumatic pressure and suitable controls, not shown, are provided for actuating all cylinders simultaneously.

It will be understood that the number of elevating mechanisms will depend upon the characteristics and dimensions of the object to be elevated for inspection.

When a bar 20¹ or other object to be inspected is elevated into inspection station 24 as indicated in broken line in FIG. 1 at 37, the elevated object with the magnetic particle coating thereon is subjected to black light emanating from sources 38, 39 and 40 which are suitably placed to illuminate the entire length and surface of the object to be inspected.

To facilitate inspection of the elevated object and thus increase the efficiency of inspection by reducing the time thereof, travelling inspecting stations illustrated as chairs 42, movable generally parallel to the object, on rails 43 and 44 are provided. The chairs 42 are connectible to driving means such as continuous cables 45, driven by an electric motor 46, and means may be provided such as a cable clutching mechanism generally indicated at 47 and selectively operable by a clutch handle 47a on each chair, to allow the inspector to connect the chair 42 to either side of the cable 45 and thus selectively move along the length of the object to be inspected. As chairs 42 move on their rails along the length of the object to be inspected the inspectors seated therein may inspect the surfaces of the object along the entire length thereof. In the preferred embodiment of the invention two movable inspection stations are provided in the form of chairs 42 which will accommodate two inspectors, one on each side of the object.

When the inspectors have completed their inspection of a billet thus completing one cycle of operation the elevating means may be actuated to replace the object having undergone inspection in its receivers on conveyor 10 and the conveyor advanced to a position to place another object into the inspection station.

The inspector or inspectors are at no time placed in dangerous proximity to the conveyor 10, yet the inspector or inspectors may view the entire length of the object to be inspected with great facility. The disclosed inspection machine requires no manipulation of the object for inspection and the only angular movement required of the object is when it is deposited on the conveyor 10 and removed therefrom.

As previously mentioned the control of operation of the conveyor 10, magnetic fluid particle dispenser 22, and elevating mechanism may be placed under the command of an inspector or inspectors. However, if desired, operation of conveyor drive motor 11, the elevating mechanism, and discharge of the magnetic particle fluid may be placed under the control of a control system which interlocks all of the aforementioned elements and performs a cycle of inspection operation in a predetermined period of time.

While for purposes of disclosure a preferred embodiment of the invention has been illustrated and described, modifications to the disclosed embodiment of the invention as well as other embodiments thereof may occur to those skilled in the art. Accordingly, it is intended to cover in the appended claims all modifications of the disclosed embodiment of the invention as well as other embodiments thereof which do not depart from the spirit and scope of the invention.

What is claimed is:

1. Apparatus for inspecting objects, comprising a conveyor having a plurality of spaced object receivers thereon, said conveyor being arranged to receive objects to be inspected in said receivers at a deposit point and transfer the objects to a discharge point, an inspection station intermediate said deposit and discharge points, said inspection station comprising a platform positioned above said conveyor, and means for lifting an object from its receiver and lifting the object above said platform for inspection and thereafter lowering the object to the receivers from which it was lifted.

2. The apparatus of claim 1 arranged for the inspection of elongated objects wherein said conveyor comprises a plurality of parallel conveyor means having rows of receivers thereon aligned to receive elongated objects across said plurality of conveyor means.

3. Apparatus for inspecting elongated objects, comprising an endless conveyor having a plurality of spaced object receivers thereon on parallel conveyor means, said receivers being aligned across said conveyor, means for advancing said conveyor from an object deposit point toward an object discharge point, an inspection station intermediate the deposit and discharge points and located above said conveyor, and means for individually elevating objects from said receivers at a predetermined position of the object on said conveyor and delivering them to said inspection station and thereafter returning the objects to the receivers from which they were elevated.

4. Apparatus for inspecting elongated objects, comprising a plurality of parallel conveyor means having spaced object receivers aligned thereacross arranged to receive an elongated object, means for advancing said conveyor means in unison from an object deposit point toward an object discharge point, an inspection station intermediate the deposit and discharge points above said conveyor means, lifting means for engaging an elongated object at spaced apart points along its length and lifting it from its receivers and delivering it to said inspection station and thereafter returning the objects to its receivers, and means for advancing said conveyor means to move each line of receivers to said lifting means.

5. Apparatus for inspecting elongated objects of rectangular cross section, comprising an endless conveyor having a plurality of rows of object receivers thereon on parallel conveyor means, said receivers defining a V-shaped pocket arranged to receive the elongated objects on adjacent sides thereof along said rows, means for advancing said conveyor from an object deposit point toward an object discharge point, an inspection station intermediate the deposit and discharge points and located above said conveyor, and means for elevating an object from its receivers and delivering it to said inspection station and thereafter returning the object to its receivers.

6. Apparatus for inspecting elongated objects of rectangular cross section, comprising a plurality of parallel endless conveyor means having spaced object receivers aligned in rows thereacross, said receivers defining V-shaped pockets arranged to receive the elongated objects on adjacent sides thereof, means for advancing said conveyor means in unison from an object deposit point toward an object discharge point, an inspection station intermediate the deposit and discharge points above said conveyor means, and means for elevating objects from said receivers and delivering them to said inspection station and thereafter returning the objects to their receivers.

7. Apparatus arranged for the inspection of elongated objects comprising a plurality of parallel conveyor means having rows of receivers thereon alinged thereacross to receive elongated objects across said plurality of conveyor means, said conveyor being arranged to receive objects to be inspected in said receivers at a deposit point and transfer the objects to a discharge point, an inspection station intermediate said deposit and discharge points, said inspection station comprising a platform positioned above said conveyor, and means for lifting an object from its receivers and raising the object above said platform for inspection and thereafter lowering the object to the receivers from which it was lifted, said platform having inspection vehicles thereon arranged to move along the length of the elevated objects.

8. Apparatus for inspecting objects, comprising a conveyor carrying a plurality of spaced object receivers aligned thereacross, said conveyor being arranged to receive objects to be inspected in said receivers at a deposit point and transfer the objects to a discharge point, an inspection station intermediate said deposit and discharge points, said discharge station comprising a platform positioned above said conveyor, means for lifting an object from its receivers and raising the object above said platform for inspection and thereafter lowering the object to the receivers from which it was lifted, and at least one traveling inspection station on said platform movable thereon generally parallel to an object elevated above said platform for inspection.

References Cited by the Examiner
UNITED STATES PATENTS

| | | | |
|---|---|---|---|
| 2,151,077 | 3/39 | Bouvier | 198—19 |
| 2,172,386 | 9/39 | Huff | 244—21 |
| 2,857,034 | 10/58 | Griswold | 198—19 |

SAMUEL F. COLEMAN, *Primary Examiner.*

WILLIAM B. LA BORDE, *Examiner.*